(12) United States Patent
Lovato et al.

(10) Patent No.: US 6,971,804 B2
(45) Date of Patent: Dec. 6, 2005

(54) OPTIC COUPLING DEVICE, OPTIC SENSOR AND COMMUNICATION DEVICE COMPRISING SUCH A COUPLING DEVICE

(75) Inventors: Jean-Louis Lovato, Biviers (FR); Roland Moussanet, Notre Dame de Commiers (FR); Vincent Minier, Claix (FR); Michel Trouillon, Saint Martin d'Heres (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 170 days.

(21) Appl. No.: 10/358,163

(22) Filed: Feb. 5, 2003

(65) Prior Publication Data

US 2003/0161589 A1   Aug. 28, 2003

(30) Foreign Application Priority Data

Feb. 28, 2002   (FR) .................................. 02 02511

(51) Int. Cl.⁷ .............................................. G02B 6/36
(52) U.S. Cl. ........................................ 385/88; 385/53
(58) Field of Search ............................. 385/53, 88, 92, 385/94, 95

(56) References Cited

U.S. PATENT DOCUMENTS

| 4,365,864 A | 12/1982 | Cowley et al. ......... 350/96.16 |
| 4,423,922 A * | 1/1984 | Porter ......................... 385/42 |
| 4,733,094 A | 3/1988 | Carpentier et al. ......... 250/551 |
| 4,767,171 A * | 8/1988 | Keil et al. .................... 385/35 |
| 4,844,573 A | 7/1989 | Gillham et al. ......... 350/96.15 |
| 5,064,299 A * | 11/1991 | Hirschmann et al. ......... 385/33 |

(Continued)

FOREIGN PATENT DOCUMENTS

| EP | 0 331 338 A2 | 9/1989 |
| EP | 0 833 176 A1 | 4/1998 |
| JP | 62009305 | 1/1987 |
| WO | WO 00/79659 | 12/2000 |

OTHER PUBLICATIONS

Hasnain et al, "Monolithic Integration of Photodetector with Vertical Cavity Surface Emitting Laser", Electronics Letters, vol. 27, No. 18, Aug. 19, 1991.

Brunner et al., "Continuous-Wave Dual-Wavelength Lasing in a Two-Section Vertical-Cavity Laser", IEEE Photonics Technology Letters, IEEE Inc., vol. 12, No. 10, Oct. 2000.

(Continued)

Primary Examiner—Jennifer Doan
(74) Attorney, Agent, or Firm—Steptoe & Johnson LLP (57) ABSTRACT

The optic coupling device comprises optic emitting elements arranged in a coating material to emit a first light signal to an optic duct, and optic receiving elements separated from the emitting elements to receive a second light signal from the optic device. To improve the efficiency and simplify manufacturing, the optic receiving elements receive the second light signal through the coating material. An optic probe comprises the optic coupling device, an optic sensor, and an optic duct joining the coupling device and the sensor to transmit a first light signal to the sensor and to receive a second light signal to the coupling device. The communication device comprises two stations connected by an optic duct and comprising coupling devices.

11 Claims, 5 Drawing Sheets

U.S. PATENT DOCUMENTS

| | | | |
|---|---|---|---|
| 5,127,075 A | 6/1992 | Althaus et al. | 385/94 |
| 5,181,264 A | 1/1993 | Chiaretti et al. | 385/33 |
| 5,416,624 A | 5/1995 | Karstensen | 349/114 |
| 5,672,515 A | 9/1997 | Furlong | 436/133 |
| 6,170,996 B1 | 1/2001 | Miura et al. | 385/94 |
| 6,204,915 B1 | 3/2001 | Persegol et al. | 356/73.1 |

OTHER PUBLICATIONS

Lim et al., "Vertical-Cavity Lasers with an Intracavity Resonant Detector", IEEE Journal of Selected Topics in Quantum Electronics, IEEE Service Center, vol. 3, No. 2, Apr. 1, 1997.

* cited by examiner

OPTIC COUPLING DEVICE, OPTIC SENSOR AND COMMUNICATION DEVICE COMPRISING SUCH A COUPLING DEVICE

BACKGROUND OF THE INVENTION

The invention relates to an optic coupling device comprising optic emitting means arranged in a coating material to transmit a first light signal to an optic duct, and optic receiving means separated from the emitting means to receive a second light signal.

The invention also relates to an optic probe comprising an optic coupling device, an optic sensor, and an optic duct connecting the coupling device and the sensor to transmit a first light signal to the sensor and to send a second light signal back to the coupling device.

The invention also relates to a communication device comprising a first station and a second station joined by an optic duct and designed to transmit and receive information or data by light signals circulating in said optic duct.

STATE OF THE ART

Figure 1:
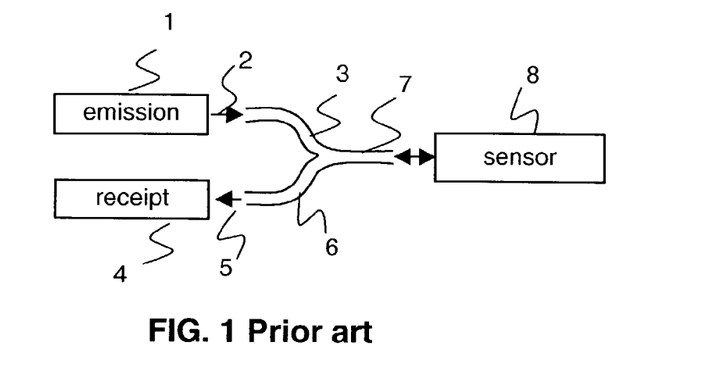
FIGS. 1 and 2 represent state-of-the-art optic coupling devices.

A state-of-the art coupling device, notably used in probes, is represented in FIG. 1. It comprises emitting means 1 to transmit a first light signal 2 to a first optic fiber 3, and receiving means 4 to receive a second light signal 5 from a second optic fiber 6. The two fibers can be grouped together in a single duct 7 directed for example towards a sensor 8 reacting to the light signals.

Figure 2:
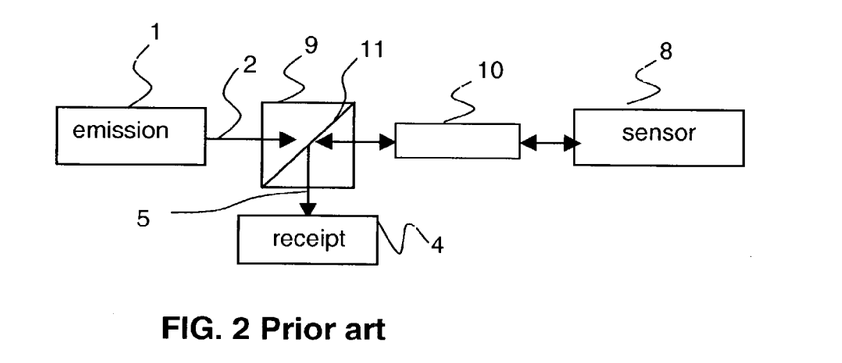

Another state-of-the-art coupling device is represented in FIG. 2. It comprises emitting means 1 to transmit a first light signal 2 to an optic separator 9 and receiving means 4 to receive a second light signal 5 from the optic separator 9. The optic signals 2 and 5 are carried by a fiber or an optic duct 10 directed towards a sensor 8. The separator 9 generally comprises a semi-reflecting blade 11 allowing the first light signal coming from the emitting means to pass and the second light signal to be reflected to the receiving means. Thus, the first light signal is emitted by the emitting means 1, passes through the separator 9 passing from the rear of the blade 11 to the front, then passes via the duct 10 to the sensor 8. In return a second signal 5 is sent back by the sensor 8 to the duct 10 and separator 9, then the signal 5 is reflected by the front face of the blade 11 to the receiving means 4.

A probe comprising such optic coupling devices is described in Patent application EP-0,940,655.

State-of-the-art optic coupling devices require the light signal paths to be doubled up either by coupling of the optic fibers or by using an optic separator. These solutions are often difficult to implement efficiently. Furthermore, the optic efficiencies of the light signal transmission channels are very low.

Electro-optic components exist comprising emitting means and receiving means in a single housing, however the operating wavelengths of these components are often incompatible with uses in probes or with sensors. Choosing the wavelengths of the emitting means and receiving means is not possible on already associated components. Moreover, these specific components have low efficiencies due in particular to the dispersion of the optic beams on output of the fibers. They also require precise positioning of the fibers and sometimes the use of optic lenses to direct the beams towards the electro-optic components.

SUMMARY OF THE INVENTION

The object of the invention is to provide an optic coupling device enabling an improved efficiency and avoiding the manufacturing problems of state-of-the-art devices. The object of the invention is also to achieve a probe and a communication device comprising such a coupling device.

In a coupling device according to the invention, the optic receiving means are arranged in such a way as to receive the second light signal through said coating material of the optic emitting means.

In a preferred embodiment, the optic receiving means, the optic emitting means, and an input of said optic duct are appreciably aligned.

Preferably, the coupling device comprises control means to control the optic emitting means and the optic receiving means alternately.

Advantageously, the optic emitting means are appreciably transparent to the wavelength of the second light signal, the optic receiving means being arranged to receive the second light signal through said coating material and through said optic emitting means.

Preferably, the optic emitting means and the optic receiving means are coated in the same material transparent to the wavelengths of said emitting means and of said receiving means.

In a preferred embodiment, the coupling device comprises a light guide arranged between the coating material and the optic receiving means to conduct the second light signal to the optic receiving means.

Advantageously, the light guide is made from the same material as the coating material of the optic emitting means.

In a preferred embodiment, the coupling device comprises an optic filter arranged between the coating material and the optic receiving means to filter the second light signal.

Preferably, the optic emitting means are arranged on a first face of a printed circuit and the optic receiving means are arranged on a second face of said printed circuit, said printed circuit comprising an opening between the optic emitting means and the optic receiving means.

Preferably, the optic emitting means and the optic receiving means operate by frequency modulation of the first optic signal and frequency demodulation of the second optic signal.

In a preferred embodiment, the coupling device comprises electronic filtering means connected between the optic receiving means and the control means to extract a variable signal from a carrier signal.

Advantageously, the optic receiving means comprise at least one receiver and the optic emitting means comprise at least two sequentially controlled emitters to emit at least two first signals having two different wavelengths.

For example, the at least two different wavelengths enable a color to be detected.

In an optic probe according to the invention comprising an optic coupling device, an optic sensor, and an optic duct joining the coupling device and the sensor to emit a first light signal to the sensor and to return a second light signal to the coupling device, the coupling device is a coupling device as defined above transmitting the first light signal to the sensor and receiving the second light signal from said sensor.

Advantageously, the optic duct is composed of a single optic fiber arranged between the sensor and the coupling device to conduct the first light signal and the second light signal.

In a preferred embodiment, the sensor is made of light-emitting material excited by the first light signal output from the optic duct and returning the second light signal to said optic duct.

For example, the sensor sends back to the optic duct a second optic signal of decreasing intensity after lighting by the first optic signal, the second signal having a different wavelength from the wavelength of the first signal.

Advantageously, the sensor returns to the optic duct a second optic signal modulated according to movement or vibration of said sensor.

In a preferred embodiment, the optic emitting means comprise at least two emitters to sequentially transmit to the sensor at least two first light signals having two different wavelengths to detect a color or a color change of said sensor, said sensor returning at least two second light signals in response to said two first light signals.

In a communication device according to the invention comprising a first station and a second station joined by an optic duct and designed to transmit and receive information or data by light signals circulating in said optic duct, the first station and the second station comprising at least one coupling device as defined above, a first optic signal emitted by emitting means of a first coupling device of the first station being received as a second optic signal by receiving means of a second coupling device of the second station, and a first optic signal emitted by emitting means of a second coupling device of the second station being received as a second optic signal by receiving means of a first coupling device of the first station.

Preferably, a first coupling device of the first station comprises a first optic filter arranged between the emitting means and the receiving means to let an optic signal emitted by emitting means of a second coupling device pass and to attenuate an optic signal having a wavelength equal or very close to the wavelength of a signal emitted by the emitting means of said first coupling device.

Preferably, a second coupling device of the second station comprises a second optic filter arranged between the emitting means and the receiving means to let an optic signal emitted by emitting means of a first coupling device pass and to attenuate an optic signal having a wavelength equal or very close to the wavelength of a signal emitted by the emitting means of said second coupling device.

Advantageously, at least one coupling device comprises modulating means to modulate in a first frequency band the first light signal designed to be emitted by the emitting means of said at least one coupling device and detecting means to detect a second light signal able to be received by the receiving means and modulated in a second frequency band.

Advantageously, the optic duct is an optic fiber connected between the first coupling device and the second coupling device.

BRIEF DESCRIPTION OF THE DRAWINGS

Other advantages and features will become more clearly apparent from the following description of particular embodiments of the invention given as non-restrictive examples only and represented in the accompanying drawings in which.

DETAILED DESCRIPTION OF PREFERRED EMBODIMENTS

Figure 3:
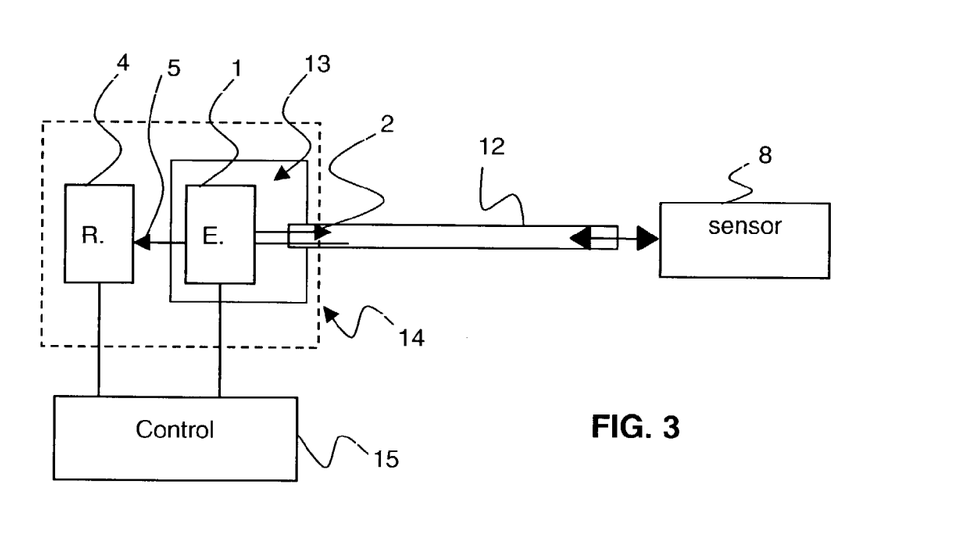
FIG. 3 represents a coupling device according to an embodiment of the invention.

In an optic coupling device 14 according to an embodiment of the invention represented in FIG. 3, the emitting means comprise an emitter 1 to emit a first optic signal 2 having a first wavelength to an optic duct 12, for example an optic fiber. The signal 2 passes through a coating material 13 of the emitter which enables the emitter 1 and optic fiber 12 to be kept in the optimum position for good efficiency. The coating material is preferably a solid and translucent broadband material enabling light signals of different color or wavelengths to pass through easily. The receiving means comprise a receiver 4 arranged so as to receive through said coating material 13 a second signal 5 generally of different wavelength from the first signal. This second signal 5 coming from the fiber 12 passes through the coating material 13 of the emitter and reaches the receiver 4. For example the emitter and receiver are appreciably aligned or slightly offset for good coupling with the optic fiber.

When the device is used in a probe, the signal 2 is sent for example to a sensor 8 which returns a second signal 5 after having been excited by the signal 2. The signal 5 returns through the fiber to the coating material 13 of the emitter, passes through said material and is detected by the receiver 4 with good efficiency. This device avoids doubling-up of the optic fibers and the use of semi-reflecting plates.

A control circuit 15 is connected to the emitter 1 and receiver 2 to control emission and receipt of the light signals. Preferably the emitter 1 sends the first signal 2 and the receiver 4 receives the second signal 5 in alternate manner.

Advantageously, the emitter is chosen from a component appreciably transparent to the wavelength of the second signal. In this case, the receiver is arranged in such a way as to receive the second light signal coming from the optic fiber through the coating material and through the emitter 1. It is also possible to fit the receiver between the input of the optic fiber and the emitter. The receiver can then be transparent to the wavelength of the first light signal.

Figure 4:
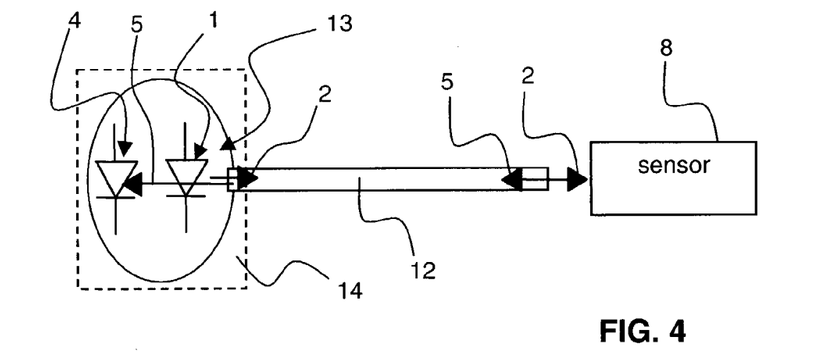
FIG. 4 represents a coupling device according to an embodiment of the invention with an emitting diode and a receiving diode.

In FIG. 4, the emitter 1 is represented by an emitting diode 1 and the receiver 4 is represented by a light signal detection diode. These two components can be coated in the same coating material 13 to emit and receive the light signals 2 and 5.

Figure 5:
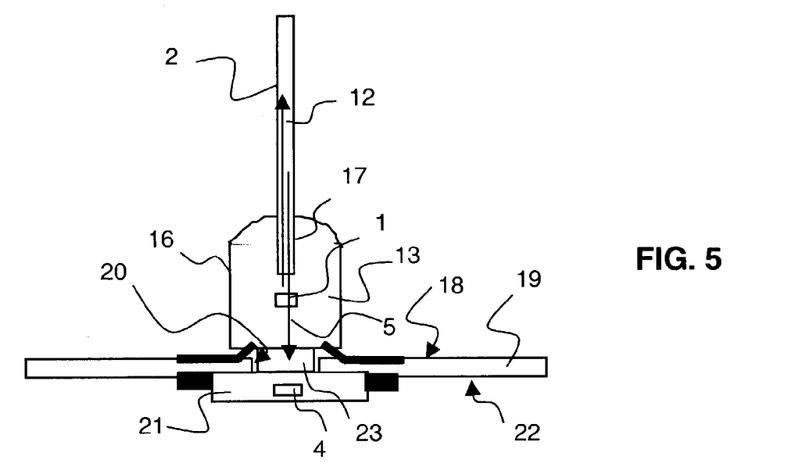
FIG. 5 represents a coupling device according to an embodiment of the invention with mounting on a printed circuit.

FIG. 5 shows a practical realization of a coupling device according to an embodiment of the invention. The emitter is a light signal emitting component such as a light-emitting diode 16 emitting in a preset wavelength. The emitting part 1 of the diode 16 is housed in a translucent or transparent housing acting as coating material 13. The housing comprises an orifice 17 to keep the optic fiber in an aligned position close to the emitting part 1. The diode 16 is arranged on a first face 18 of a printed circuit 19 comprising an opening 20 at the rear of the diode opposite the orifice 17. The receiver is a photosensitive component 21 such as a diode or a phototransistor arranged on a second face 22 of the printed circuit 19 appreciably in the alignment of the optic fiber and the diode 16.

The components 16 and 21 are preferably mounted and soldered on the faces of the printed circuit like surface-mounted components. To prevent the second signal 5 from being dispersed in the air between the component 16 and the component 21, a small light guide 23 can advantageously be arranged between the two components 16 and 21. The second signal 5 coming from the optic fiber 12 passes through the material 13 represented by the housing of the diode 16, the passes through the guide 23 and reaches the component 21 comprising the receiver 4.

Figure 6:
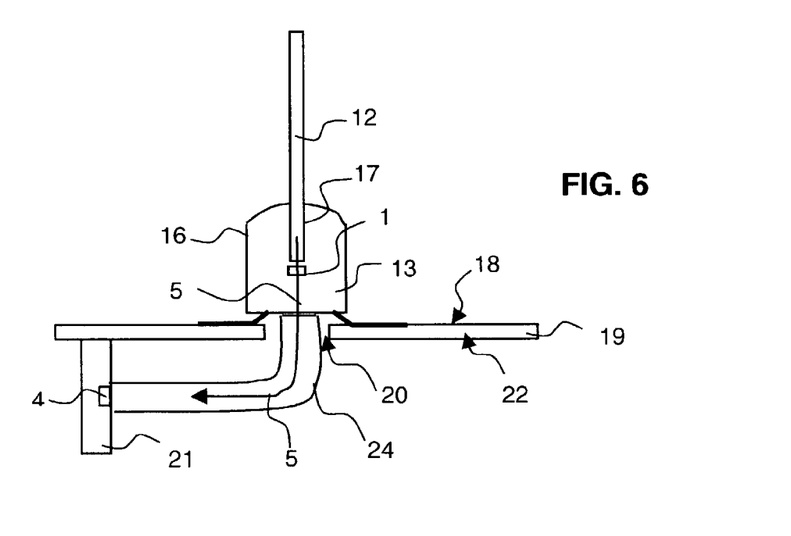
FIG. 6 represents a coupling device according to an embodiment of the invention with an optic guide.

In FIG. 6, the component 21 comprising the receiver 4 is arranged in remote manner. A light guide 24 is then arranged between the rear of the component 16 and the component 21 to conduct the second light signal from the material 13 of the housing of the component 16 to the component 21. Preferably, the light guides 23 and 24 are made from the same material as the coating material 13.

Figure 7:
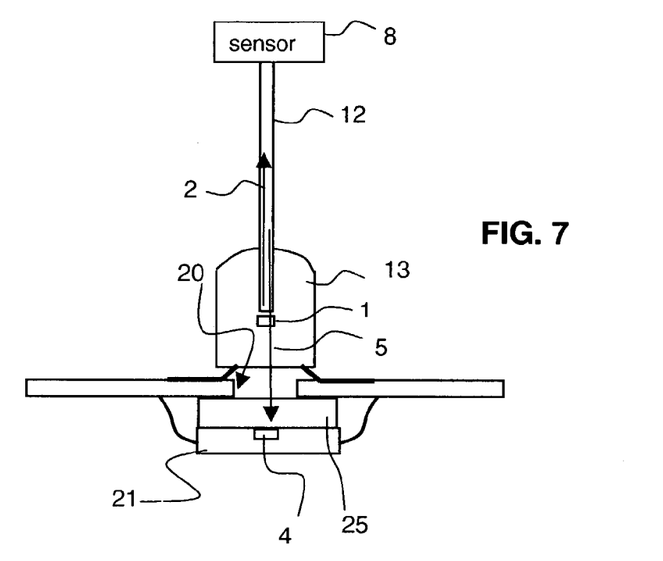
FIG. 7 represents a coupling device according to an embodiment of the invention with an optic filter.

In FIG. 7, an optic filter 25 is arranged between the coating material 13 and the component 21 comprising the receiver 4 to let the second signal 5 pass and to stop signals having other wavelengths. Thus, the second signal returning from the sensor 8 is conducted by the optic fiber 12, passes through the coating material 13, passes through the optic filter 25 and reaches the receiver 4 of the component 21. Stray light rays having different wavelengths from that of the second signal are thus stopped or attenuated.

Figure 8:
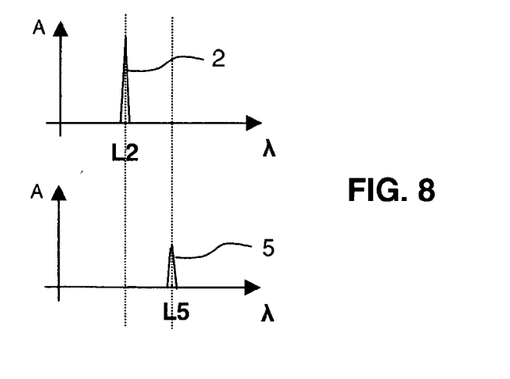
FIG. 8 represents different wavelengths of the optic signals.

FIG. 8 shows spectral curves of a first signal 2 and a second signal 5. For example, the first signal 2 has a color or a main wavelength L2 and a high amplitude, and the second signal 5 has a color or a main wavelength L5 and a lower amplitude. The wavelengths L2 and L5 are different. The wavelengths L2 and L5 can be central or main frequencies of the signals 2 and 5 modulated in amplitude or frequency. For example, the emitting means can operate in frequency modulation and the receiving means can operate in frequency demodulation. Modulation and demodulation can also be performed with a centralized control circuit and/or associated electronic circuits.

Figure 9:
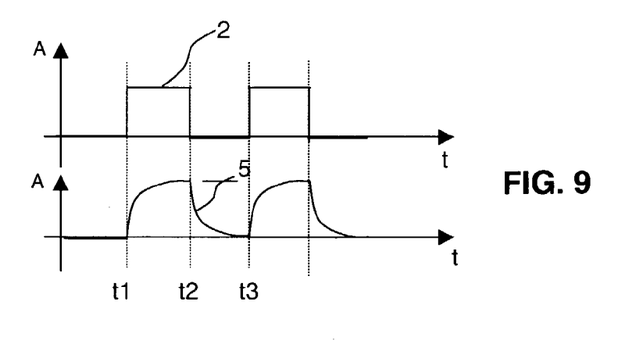
FIG. 9 represents shapes of optic signals in a probe comprising a coupling device according to the invention.

FIG. 9 shows curves of a first signal 2 and a second signal 5 versus time. For example, the first signal 2 has a rectangular shape forming crenellations where a top part represents the presence of light, between times t1 and t2, and the bottom part represents the absence of light, between the time t2 and a time t3. In a sensor 8 made of light-emitting or fluorescent material, the second signal 5 has an intensity that increases in the presence of the first signal 2, and an intensity that decreases when the signal 2 reaches zero or a very low value. In a temperature sensor where the sensor is for example ruby or alexandrite, the decreasing part of the signal 5 is representative of the value of the temperature. Thus, the control means command excitation of the sensor between the times t1 and t2 by emission of the signal 2, and activate receipt and acquisition and/or measurement of the signal 5 to determine a temperature value, notably between the times t2 and t3.

Figure 10:
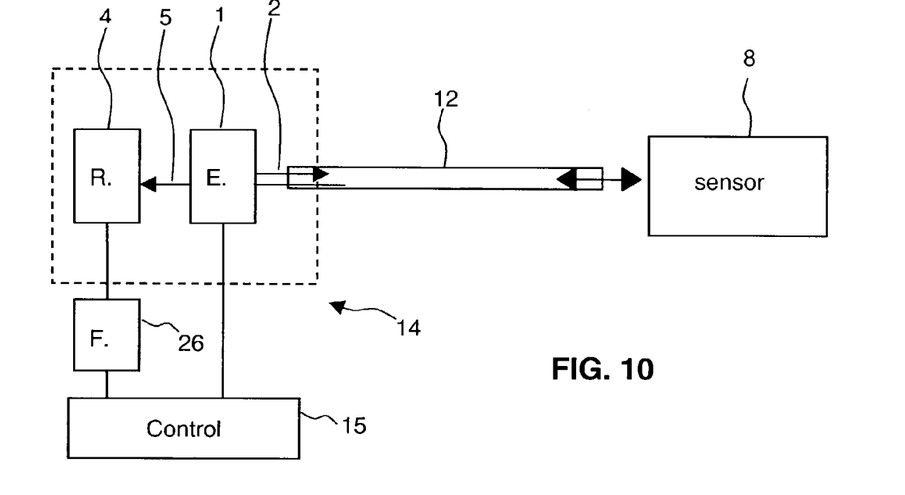
FIG. 10 represents a vibration detection probe comprising a coupling device according to an embodiment of the invention.

FIG. 10 represents a vibration detection probe comprising a coupling device 14. The sensor 8 then enables mechanical vibrations to be detected, in particular sounds, ultra-sounds, pressures, or movements. The optic coupling device emits a signal 2 to the sensor and receives a second signal 5 to the receiver 4 modulated according to the vibrations detected. The sensor can have the form of a deformable membrane having a reflecting face. An electronic filter 26 connected between the receiver 4 and the control circuit 15 lets the useful signal representative of the detected vibrations pass and reduces the other signals.

Figure 11:
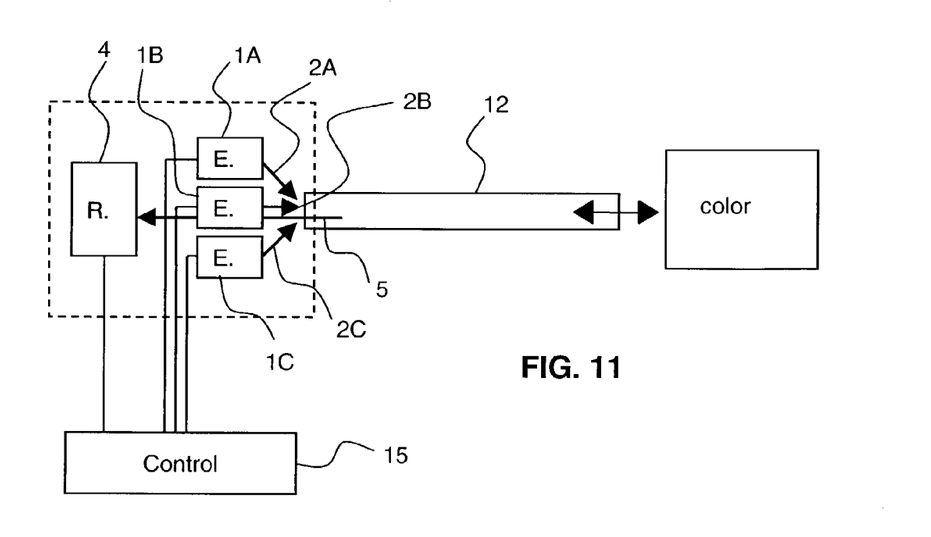
FIG. 11 represents a color detection probe comprising a coupling device according to an embodiment of the invention.

FIG. 11 represents a color detection probe comprising a coupling device according to a particular embodiment. To detect a color, the emitting means comprise at least two emitters to emit two first signals having two different wavelengths. The emitters are preferably controlled sequentially. In the diagram of FIG. 11, the emitting means comprise three emitters 1A, 1B and 1C to sequentially emit three first signals respectively 2A, 2B and 2C to the duct or the optic fiber 12. In return, the sensor sends back sequentially on a second signal 5 responses from said sensor or a signal representative of the color detected. The sensor can be an object on which a color has to be detected or determined. Analysis by a control circuit 15 of information sequences of the signal 5 enables a color to be determined.

The three emitters can be incorporated in a single electronic component for example integrating light-emitting diodes of red, green and blue color. It is also possible to detect a color by having a single emitter emitting for example white light and to have three receivers sensitive to different wavelengths or each comprising a different filter to determine the color of the sensor.

Figure 12:
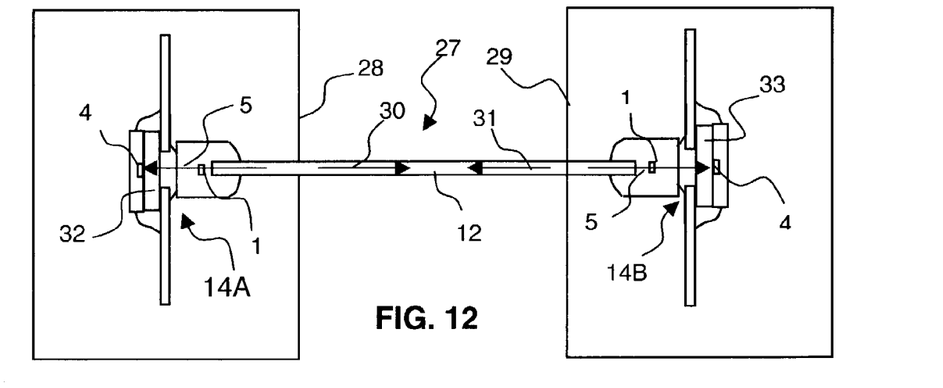
FIGS. 12 and 13 represent communication devices comprising coupling devices according to embodiments of the invention.

FIG. 12 shows a communication device 27 comprising a first station 28 and a second station 29 joined by an optic duct 12 and designed to emit and receive information or data by light signals 30 and 31 flowing in said optic duct. The first station 28 and second station 29 comprise at least one coupling device as defined in embodiments described above. A first optic signal 30 emitted by emitting means 1 of a first coupling device 14A of the first station 28 is received as a second optic signal 5 by receiving means 4 of a coupling device 14B of the second station 29. A first optic signal 31 emitted by emitting means of a second coupling device 14B of the second station 29 is received as a second optic signal 5 by receiving means 4 of a coupling device 14A of the first station 28.

To communicate efficiently, the first coupling device 14A of the first station 28 comprises a first optic filter 32 arranged between the emitting means 1 and the receiving means 4 to let an optic signal emitted by emitting means 1 of a second coupling device 14B pass and to attenuate an optic signal having a wavelength equal or very close to the wavelength of a signal emitted by the emitting means of the first coupling device 14A.

Likewise, the second coupling device 14B of the second station 29 comprises a second optic filter 33 arranged between the emitting means 1 and the receiving means 4 to let an optic signal emitted by emitting means of a first coupling device 14A pass and to attenuate an optic signal having a wavelength equal or very close to the wavelength of a signal emitted by the emitting means of the second coupling device 14B.

For example, the first emitting means of the first coupling device 14A can be a light-emitting diode emitting in the green and the first emitting means of the second coupling device 14B can be a light-emitting diode emitting in the red. Thus, the first optic filter 32 blocks the green light rays and lets the red light rays pass whereas the second optic filter 33 blocks the red light rays and lets the green light rays pass. Preferably, the light-emitting diodes emit in the red or green but comprise a transparent or colourless plastic housing.

Figure 13:
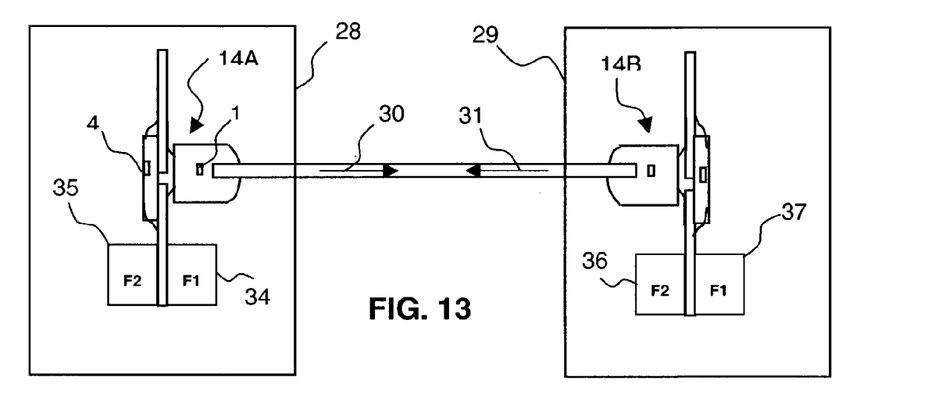

FIG. 13 shows communication devices also able to operate without optic filters. In this case, for example a coupling device 14A comprises a modulation circuit 34 to modulate the first light signal 30 designed to be emitted by emitting means 1 of said first coupling device 14A in a first frequency band F1 and detecting means 35 to detect a second light signal able to be received by the receiving means 4 and modulated in a second frequency band F2. The second coupling device 14B comprises a modulation circuit 36 to modulate the second light signal 31 designed to be emitted by emitting means 1 of said second coupling device 14B in the second frequency band F2 and detecting means 37 to detect a first light signal 30 able to be received by the receiving means 4 and modulated in the first frequency band F1.

Figure 14A:
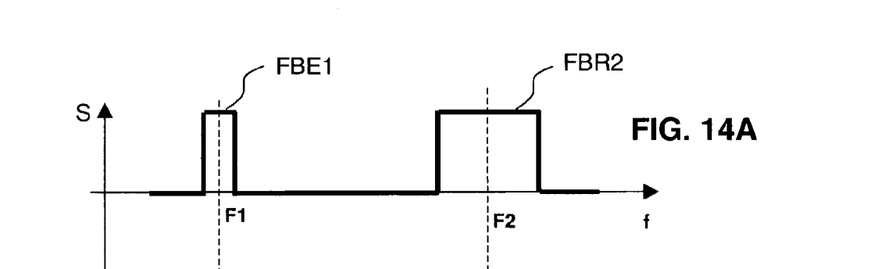
FIGS. 14A and 14B represent signals in communication devices comprising coupling devices according to embodiments of the invention.
Figure 14B:
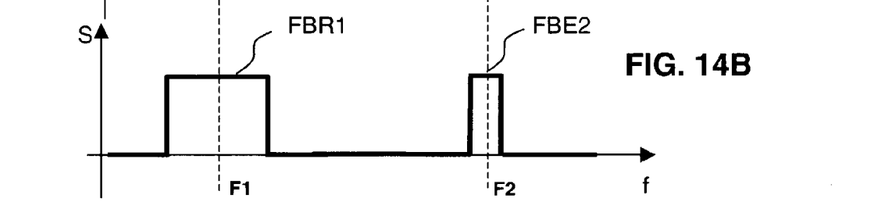

FIGS. 14A and 14B illustrate frequency operating bands of the emitting, receiving and detecting means, and of the modulation or demodulation circuits. In FIG. 14A, the first coupling device 14A emits in a frequency band FBE tuned to the frequency F1, and receives on a frequency band FBR tuned to the frequency F2. In FIG. 14B, the second coupling device 14B emits in a frequency band FBE tuned to the frequency F2, and receives on a frequency band FBR tuned to the frequency F1. Advantageously, the frequency bands on receipt are broader than the frequency bands on emission. The frequencies are sufficiently far apart not to interfere in case of two-way communication.

The optic duct is preferably an optic fiber connected between the first coupling device and the second coupling device but other ducts or guides may be used.

The receiving means can notably be photodiodes, phototransistors or photoresistors. The emitting and receiving means can for example be housed in locally open or transparent plastic or metallic housings. The component housings forming the coating material of the emitting means may comprise reflecting walls to improve the efficiency of emission and receipt.

What is claimed is:

1. An optic coupling device comprising optic emitting means arranged in a coating material to transmit a first light signal to an optic duct, and optic receiving means separated from the emitting means to receive a second light signal from said optic duct, said coating material of the optic emitting means being appreciably transparent to the wavelength of the second light signal, said optic receiving means being arranged in such a way to receive the second light signal through said coating material of the optic emitting means, and said second light signal flowing in the proximity of said optic emitting means or through said optic emitting means before being received by the receiving means.

2. Coupling device according to claim 1 wherein the optic receiving means, the optic emitting means, and an input of said optic duct are appreciably aligned.

3. Coupling device according to claim 1, further comprising control means to control the optic emitting means and the optic receiving means alternately.

4. Coupling device according to claim 3, further comprising electronic filtering means connected between the optic receiving means and the control means to extract a variable signal from a carrier signal.

5. Coupling device according to claim 1 wherein the optic emitting means are appreciably transparent to the wavelength of the second light signal, the optic receiving means being arranged to receive the second light signal through said coating material and through said optic emitting means.

6. Coupling device according to claim 1 wherein the optic emitting means and the optic receiving means are coated with the same material transparent to the wavelengths of said emitting means and of said receiving means.

7. Coupling device according to claim 1 wherein the optic emitting means and the optic receiving means operate by frequency modulation of the first optic signal and frequency demodulation of the second optic signal.

8. An optic probe comprising an optic coupling device, an optic sensor, and an optic duct connecting the coupling device and the sensor to emit a first light signal to the sensor and to send a second light signal back to the coupling device, wherein the coupling device is a coupling device according to claim 1 emitting the first light signal to the sensor and receiving the second light signal from said sensor.

9. Optic probe according to claim 8 wherein the optic duct is composed of a single optic fiber arranged between the sensor and the coupling device to conduct the first light signal and the second light signal.

10. Optic probe according to claim 8 wherein the sensor is made of light-emitting material excited by the first light signal output from the optic duct and returning the second light signal to said optic duct.

11. Optic probe according to claim 8 wherein the sensor sends back to the optic duct a second optic signal of decreasing intensity after lighting by the first optic signal, the second signal having a different wavelength from the wavelength of the first signal.

* * * * *